US011424666B1

(12) United States Patent
Paritee et al.

(10) Patent No.: US 11,424,666 B1
(45) Date of Patent: Aug. 23, 2022

(54) MANUFACTURED COIL FOR AN ELECTRICAL MACHINE

(71) Applicant: Maxxwell Motors, Inc., Franklin, TN (US)

(72) Inventors: Michael Paritee, Princeton Junction, NJ (US); Maksym Pryimak, Kiev (UA)

(73) Assignee: Maxxwell Motors, Inc., Franklin, TN (US)

( * ) Notice: Subject to any disclaimer, the term of this patent is extended or adjusted under 35 U.S.C. 154(b) by 0 days.

(21) Appl. No.: 17/205,191

(22) Filed: Mar. 18, 2021

(51) Int. Cl.
*H02K 15/04* (2006.01)
*H02K 3/28* (2006.01)
*H02K 1/18* (2006.01)
*H02K 3/04* (2006.01)
*H02K 3/26* (2006.01)

(52) U.S. Cl.
CPC ......... *H02K 15/0407* (2013.01); *H02K 1/182* (2013.01); *H02K 3/04* (2013.01); *H02K 3/26* (2013.01); *H02K 3/28* (2013.01); *H02K 15/0464* (2013.01); *H02K 2213/03* (2013.01)

(58) Field of Classification Search
CPC .. H02K 15/0407; H02K 3/28; H02K 15/0464; H02K 2213/03; H02K 3/04; H02K 3/26; H02K 1/18; H02K 17/02; H02K 1/182; H02K 1/2793; H02K 21/026; H02K 21/24; H02K 37/08; H02K 37/125
USPC ....................................................... 310/179
See application file for complete search history.

(56) References Cited

U.S. PATENT DOCUMENTS

| 2,503,704 | A | 4/1950 | Bessiere |
| 3,069,577 | A | 12/1962 | Lee |
| 3,223,867 | A | 12/1965 | Shapiro |
| 3,296,475 | A | 1/1967 | Parker |
| 3,699,372 | A | 10/1972 | Abe et al. |
| 4,320,645 | A | 3/1982 | Stanley |
| 4,370,582 | A | 1/1983 | Addicott et al. |
| 4,864,175 | A | 9/1989 | Rossi |
| 4,866,321 | A | 9/1989 | Blanchard et al. |
| 5,218,251 | A | 6/1993 | Allwine, Jr. |
| 5,789,841 | A * | 8/1998 | Wang ................. H02K 3/28 310/179 |
| 7,132,775 | B2 | 11/2006 | Oohashi et al. |
| 7,315,102 | B2 | 1/2008 | Minagawa |
| 8,390,157 | B2 | 3/2013 | Watanabe et al. |

(Continued)

FOREIGN PATENT DOCUMENTS

| GB | 1421770 A | 1/1976 |
| GB | 2228626 A | 8/1990 |

(Continued)

OTHER PUBLICATIONS

Jacek F. Gieras, et al., Axial Flux Permanent Magnet Brushless Machines (2nd ed. 2008).

(Continued)

*Primary Examiner* — Ahmed Elnakib
(74) *Attorney, Agent, or Firm* — Sterne, Kessler, Goldstein & Fox P.L.L.C.

(57) ABSTRACT

Embodiments involve a coil winding for a rotating electric machine that are formed from conductive materials using a three dimensional printer. The coil winding is printed as a unitary structure with interconnects connecting coils of the same phase. The rotating electric machine may be an axial flux machined with three phases.

15 Claims, 13 Drawing Sheets

(56) References Cited

U.S. PATENT DOCUMENTS

| | | |
|---|---|---|
| 8,745,847 B2 | 6/2014 | Stephenson |
| 9,859,772 B2 | 1/2018 | Bang et al. |
| 10,097,070 B1 | 10/2018 | Boyd |
| 10,135,310 B2 | 11/2018 | Schuler et al. |
| 10,903,729 B1 | 1/2021 | Cunnyngham et al. |
| 10,938,258 B1 | 3/2021 | Cunnyngham et al. |
| 10,951,103 B1 | 3/2021 | Cunnyngham et al. |
| 11,025,107 B2 | 6/2021 | Cunnyngham et al. |
| 11,081,934 B2 | 8/2021 | Cunnyngham et al. |
| 11,088,578 B2 | 8/2021 | Cunnyngham et al. |
| 2004/0051401 A1 | 3/2004 | Hansen |
| 2004/0070307 A1 | 4/2004 | Haugan et al. |
| 2004/0119374 A1 | 6/2004 | Carl, Jr. et al. |
| 2005/0052080 A1 | 3/2005 | Maslov et al. |
| 2006/0103263 A1* | 5/2006 | Naito ............ B60L 50/51 310/156.32 |
| 2006/0152104 A1 | 7/2006 | Hino et al. |
| 2007/0063594 A1 | 3/2007 | Huynh |
| 2007/0138902 A1 | 6/2007 | Ahn et al. |
| 2008/0001488 A1 | 1/2008 | Pyrhonen et al. |
| 2008/0129136 A1 | 6/2008 | Abe et al. |
| 2008/0290752 A1 | 11/2008 | Yamamoto et al. |
| 2009/0085421 A1 | 4/2009 | Saito et al. |
| 2009/0218906 A1 | 9/2009 | Adachi et al. |
| 2009/0243422 A1 | 10/2009 | Atarashi et al. |
| 2011/0025067 A1 | 2/2011 | Cipriani |
| 2011/0025158 A1 | 2/2011 | Aiki et al. |
| 2011/0142694 A1 | 6/2011 | Fagotti |
| 2011/0241460 A1 | 10/2011 | Mebarki et al. |
| 2011/0316381 A1 | 12/2011 | Asano et al. |
| 2013/0069467 A1 | 3/2013 | Smith et al. |
| 2014/0091673 A1 | 4/2014 | Anbarasu et al. |
| 2014/0265700 A1 | 9/2014 | Patterson et al. |
| 2015/0229189 A1 | 8/2015 | Tsuiki et al. |
| 2016/0013692 A1* | 1/2016 | Wawrzyniak ......... H02K 3/14 219/76.1 |
| 2016/0072362 A1 | 3/2016 | Kube |
| 2016/0285339 A1 | 9/2016 | Smith et al. |
| 2016/0352201 A1 | 12/2016 | Ranjan et al. |
| 2016/0365755 A1* | 12/2016 | Long ............ H02K 15/0478 |
| 2017/0288486 A1 | 10/2017 | Hoemann et al. |
| 2017/0323713 A1 | 11/2017 | Moeller et al. |
| 2017/0353072 A1* | 12/2017 | Mcsheery ............ H02K 1/12 |
| 2018/0205298 A1* | 7/2018 | Huang ............ H02K 1/24 |
| 2018/0212489 A1 | 7/2018 | Schuler et al. |
| 2018/0219466 A1 | 8/2018 | Akanuma et al. |
| 2019/0058364 A1 | 2/2019 | Mao et al. |
| 2019/0058365 A1 | 2/2019 | Aida et al. |
| 2019/0214883 A1* | 7/2019 | Klassen ............ B25J 9/126 |
| 2019/0260252 A1* | 8/2019 | Lam ............ H02K 15/02 |
| 2019/0288584 A1 | 9/2019 | Vansompel et al. |
| 2020/0076262 A1 | 3/2020 | Klonowski et al. |
| 2021/0013784 A1* | 1/2021 | Shirazee ............ H02K 15/105 |
| 2021/0135514 A1 | 5/2021 | Cunnyngham et al. |
| 2021/0135515 A1 | 5/2021 | Cunnyngham et al. |
| 2021/0135525 A1 | 5/2021 | Cunnyngham et al. |
| 2021/0135544 A1 | 5/2021 | Cunnyngham et al. |
| 2021/0218321 A1 | 7/2021 | Cunnyngham et al. |

FOREIGN PATENT DOCUMENTS

| | | |
|---|---|---|
| JP | 58116043 A | 7/1983 |
| WO | WO 96/04094 A2 | 2/1996 |
| WO | WO 2021/013816 A1 | 1/2021 |

OTHER PUBLICATIONS

International Search Report and Written Opinion of the International Searching Authority directed to related International Patent Application No. PCT/US2020/055740, dated May 6, 2021; 11 pages.

* cited by examiner

MANUFACTURED COIL FOR AN ELECTRICAL MACHINE

FIELD OF THE INVENTION

This application generally relates to coils for electrical machines, such as motors and generators.

BACKGROUND

Rotating electrical machines, such as motors and generators, are known to exist in various different types and geometries. For example, some rotating electric machines rely on permanent magnets for magnetic pole pieces. These permanent magnets, for performance reasons, typically include rare earth elements such as neodymium, samarium, cerium, terbium, praseodymium, gadolinium, and dysprosium. Permanent magnet synchronous machines are often desirable because they exhibit a high starting torque, high efficiency, and high power density.

However, the rare earth metals that high performance permanent rotating electrical machines rely on are produced primarily by mines in only a few regions of the world. The rare earth elements used for the magnets add considerable cost to the machine, and the process of mining them is nearly always very damaging to the environment. They introduce vulnerabilities in the supply chain. Finally, when heat is applied there is a risk they could lose their magnetic properties.

An alternative to a permanent magnet rotating electrical machine is an induction rotating electrical machine. Induction machines do not rely on permanent magnets. Instead, induction machines use induced magnetic fields brought about by changing currents to operate. The cores of an induction machine may simply be iron, or other material that is magnetically permeable. While induction machines avoid the need for rare earths, widely available induction machines are thought to be unsuitable for many applications because of their lower power density and lower starting torque.

In general, rotating electrical machines exist in two geometries: radial and axial. Radial flux motors transmit magnetic flux perpendicular to the motor's shaft. With these radial flux motors, the rotor—the component of the motor that rotates—and the stator—the component of the motor that remains stationary—both tend to be cylindrical in shape and concentric with one another. For example, the stator may enclose the rotor and transmit magnetic flux inward toward the rotor. The magnetic flux applies torque to the rotor, making it turn. An example is a conventional squirrel cage motor.

In contrast, axial flux motors transmit magnetic flux parallel to the motor shaft. Instead of being concentric cylinders, in an axial flux motor the rotor and stator may be discs mounted parallel to one another and perpendicular to the motor shaft. The stator applies magnetic flux through the rotor, creating torque. An example of such an axial flux motor was disclosed by Pyrhonen et al. in U.S. Pat. Pub. No. 2008/0001488, entitled "Axial Flux Induction Electric Machine."

In general, axial flux motors tend to be more compact than radial flux motors having the same power. In other words, an axial flux geometry tends to produce a higher power density. All other things, including axial length, being equal, increasing a radius of a radial flux motor may increase power output by the difference in radius squared. In contrast, all other things being equal, increasing a radius of an axial flux motor may increase power output by the difference in radius cubed. The result is that greater power output can be achieved by using less materials than would be required for a radial machine of equivalent power.

Often, stators have teeth with wires, called windings, wrapped around them. The windings may be insulated from one another, allowing current to flow only along the wires. Such insulation reduces the density of the conductive materials, and ultimately can limit the power density of the rotating electric machine. Conventionally, stator teeth have, at their top, a tip that closes in toward adjacent teeth, making the teeth wider at the top and narrower at the bottom and making the stator slots partially closed. This is thought to provide special magnetic reluctance to the air gap. The tip is thought to allow the magnetic flux to be transmitted in a cleaner sine wave. Any harmonics away from that sine wave can cause additional losses in the rotor.

Consistent with partially closed slots, windings for axial induction machines are typically wound by hand. Doing so introduces a number of problems. First, it is a labor-intensive process that accounts for a significant portion of machine costs. Second, it introduces an opportunity for error. Third, the number and type of windings that can be fixed into or made within the interior annulus between the stator's teeth is limited by the operator's skill and the geometry of the wire, the wire's insulation, and the interior of the stator. Kinks can occur during the winding, increasing unwanted electrical resistance and dramatically increasing the risk of mechanical and thermomechanical fatigue failure in the winding. This is especially true for axial stators, because the endturns needed for the coils have a smaller bending radius. The fill factor of the stator's slots is also reduced, thus restricting the amount of H field (total magnetization) that can be generated in the slot. This limits the power density of the resulting machine.

What is needed is a cost effective method of manufacturing coil winding for an electrical machine.

SUMMARY

Embodiments of a coil windings for a rotating electrical machine are disclosed. The coil winding assembly may be printed using a three dimensional printer. The three dimensional printer may print all aspects of the coil winding including the coils, interconnects, and, in some embodiments, insulation layers. The winding process may be additive and proceed layer by layer, where each layer forms a component of a coil or interconnect. The winding may be formed by a process that includes printing, using a three dimensional printer, a first coil layer. A second coil layer may be printed over the first coil layer using a three dimensional printer. Interconnects connect one or more coils or one or more coil layers. The interconnects may also be printed with the winding to create a unitary winding. The winding may be printed of a conductive material. According to some embodiments, the winding includes a third layer printed using a three dimensional printer. The number of coil layers corresponds to a thickness of the rectangular wire in the axial direction and a height of the stator teeth to maximize the volume of space in the slot occupied by the conductive material of the coil.

The coil layers may be lapped such that the lapped layers form openings configured to receive a stator core. The layers may form layers of individual coils. Each coil may be connected to a phase circuit. A phase circuit may be configured to carry a periodically varying electrical signal across the coils connected to the phase circuit. In some embodiments, the coil is electrically connected to one of a first, a second, and a third phase circuit. The electrical signal carried by each phase circuit may be offset from other electrical signals carried by the other phases. The offset may correspond to 360 degrees divided by the number of phase circuits. For example, if three phase circuits are used, the offset may be 120 degrees. Each coil may correspond to only one phase circuit such that the lapped coils of adjacent coil layers are electrically connected to the same phase circuit.

In some embodiments, an insulation layer may be applied to the winding. The insulation may be printed on the coils between the coil layers. In some embodiments, the insulation may be applied using other means. For example, the insulation may be applied by dipping the winding into a bath of insulating material.

As previously mentioned, the coil layers form coils. Each coil may have a first segment and a second segment. The first segment may have a first cross section area and the second segment may have a second cross section area. In some embodiments, the first segment may be an inner or an outer segment and the second segment may be a slot segment. The slot segment may be configured to be located in the slot of a stator. The slot segments of the various coils may be radially aligned. The inner segments may be configured to be arranged radially inward of the slots of the stator and the outer segments may be configured to be arranged radially outside of the slots of the stator. In some embodiments, the first segment cross section may be greater than the second cross section area.

In some embodiments, the first segments may be connected to an interconnect. As stated above, interconnects may connect coils. Interconnects may connect the first sections of coils.

In some embodiments, the segments of the coil may have a rectangular cross section.

In some embodiments, the width of the second, or slot segment, may correspond to the width of the slot.

A winding for a rotating electrical machine may be made by printing, using a three dimensional printer, coils configured to carry a current. For example, the winding may be made of a metal. The winding may also include interconnects. Each interconnect may electrically connect one or more coils. In some embodiments, interconnects may be printed with the coils to form a unitary structure.

In some embodiments, a method of manufacturing a coil includes printing a first end. A first segment is printed such that it extends from the first end. The first segment has a first cross section area. A second segment is printed extending from the first segment opposite the first end. The second segment has a second segment cross section area. The cross section area of the first cross section area is greater than the second cross section area. The coil is formed of a conductive material. In some embodiments, a second end is printed on the first end. A third segment is printed such that it extends from the second end. The third segment has a third cross section area. A fourth segment is printed extending from the third segment opposite the second end. The fourth segment has a cross section area. The third cross section area is greater than the fourth cross section area. The third segment may be lapped over (i.e. parallel yet separated from) the first segment. Similarly, the fourth segment may be lapped over the second segment.

As describe above, the coil winding may be printed using a three dimensional printer. The three dimensional printer may be instructed to print the coil windings by a file. The file may contain instructions for execution by the three dimensional printer that causes the three dimensional printer to print a coil winding having any of the features described herein.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

DETAILED DESCRIPTION

Figure 1:
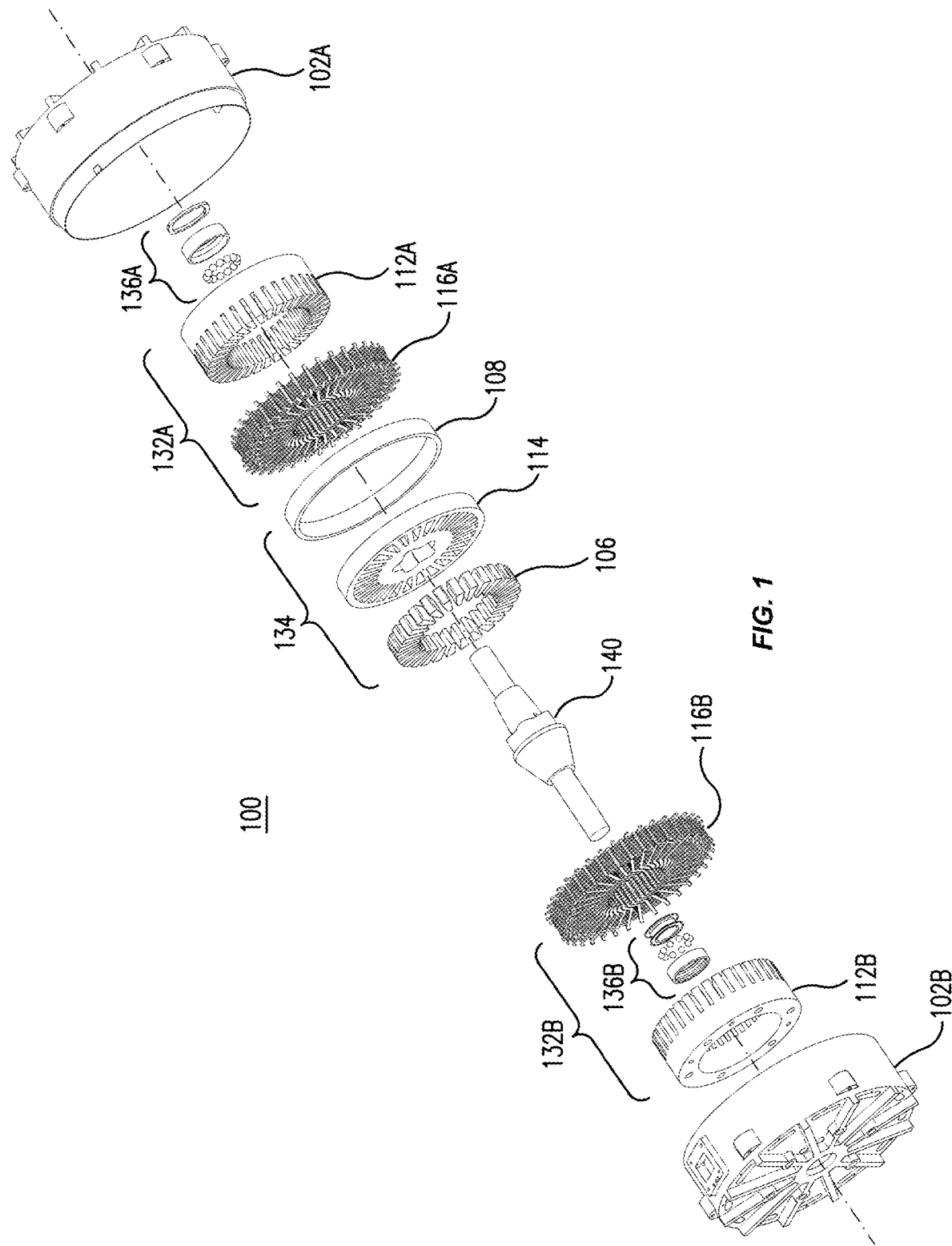
FIG. 1 shows an assembly for an axial flux machine according to some embodiments.

Disclosed herein is a three dimensional printed coil assembly. The coil assembly may be used with rotating electrical machines, for example with an axial flux induction rotating electrical machine.

As mentioned above, conventionally, windings for axial flux induction motors are wound by hand. Embodiments disclosed herein provide an automated way to manufacture an entire coil winding assembly with the use of a three dimensional printer. According to some embodiments, wire segments are printed to form an entire coil winding assembly. The wire segments may be formed with different geometries. For example, the wire may have a rectangular cross section. Wires with rectangular cross sections may maximize the amount of current that can pass through the slot of the stator to increase the efficiency and power of the machine. The wire assembly may also have a variable cross sectional area across the wire. The use of three dimensional printer permits a single wire segment to have multiple and varying cross section geometries.

Coil windings with different cross sectional dimensions may improve the overall function of the machine. For example, the current density is reduced if the cross sectional area is increased. High current densities result in high heat. This may require cooling. By varying the coil cross sectional area, the current density in certain portions of the wire may be decreased. For example, the cross sectional area of a wire segment located outside the stator (either radial inside or outside the stator) may be larger than a cross sectional area of a wire segment located between the teeth of the stator. The larger cross sectional area of the wire segment outside the stator reduces the current density in these portions of wire. This reduces the heat in these sections of wire. This localizes the heat generated by the wire assembly to the portions between the stator teeth. Thus, the cooling methods can be focused on these portions of the assembly as needed, further reducing operating and manufacturing costs.

The entire coil winding assembly is printed into a shape to fit over at least one tooth of the stator, resulting in a coil. The coils can be lapped into one another, interleaved, and interconnected into phases to make the stator windings. One reason why stator windings are conventionally inserted by hand is that their slots are partially closed, resulting in a widening of the stator teeth at the top. Conventionally inserted stator windings may also have a smaller fill factor because the wire must be narrow enough to pass through the partially closed slot in the stator. This means that small voids are present in the areas between the teeth not occupied by the windings. This reduces the amount of current that can be carried through the slots in the stator, reducing the overall effectiveness of the machine. However, according to an embodiment, the stator teeth are open in such a way that the assembled stator windings can be slipped directly down onto the stator, obviating any need to hand-wind the coil assembly. This further reduces the manufacturing costs and greatly reduces the manufacturing time. Moreover, the number of winding errs are significantly reduced.

Cost-effectiveness of the resulting machine is provided for by avoiding the need for the manual, labor intensive wire insertion process. The resulting machine may also have equivalent or greater power density to conventional rare earth machines in a radial configuration results in lower mass. The lower mass results in knock on effects which provide additional cost savings for applications such as electric cars.

Reference will now be made in detail to representative embodiments illustrated in the accompanying drawings. First, assembly of an example axial flux electric motor is described with reference to FIG. 1. Second, a stator and with a three dimensionally printed component of a coil winding is described with reference to FIG. 2. Third, exemplary coils of a coil winding from using a three dimensional printer are described with reference to FIG. 3. Fourth, the structure of a coil winding is described with reference to a section of the printed coil winding is described in FIG. 4. Fifth, the details of a coil winding printed using a three dimensional printer are described with reference to FIGS. 5-7. Sixth, the current density distribution of a coil winding printed using a three dimensional printer is described with reference to FIG. 8. Finally, current phases are described with reference to FIG. 9. It should be understood that the following descriptions are not intended to limit the embodiments to one preferred embodiment. To the contrary, it is intended to cover as many alternatives, modifications, and equivalents as can be included within the spirit and scope of the described embodiments as defined by the claims.

Axial Flux Machine Assembly

FIG. 1 shows an assembly for an axial flux machine 100 according to some embodiments. Axial flux machine 100 includes two endbells 102A and 102B, two stators 132A and 132B, two bearing assemblies 136A and 136B, shaft 140, and a rotor 134. Also mounted to endbells 102A and 102B are bearing assemblies 136A and B. Bearing assemblies 136A and B provide a rigid support for shaft 140 while allowing shaft 140 to spin with a minimal amount of friction. In this embodiment, rotor 134 is located between stators 132A and 132B.

Rotor 134 includes a plurality of cores, such as core 106, a rotor winding 114, and a band 108. Each core is placed within a cavity of rotor winding 114. The rotor winding 114 is surrounded by band 108. Rotor winding 114 carries the current induced by stators 132A and 132B. In an embodiment, rotor winding 114 consists of a solid disc of conductive material that comprises a plurality of cavities. The disc may be a flattened cylinder in shape.

As stated above, stators 132A and 132B are configured to receive coil winding assemblies 116A and 116B, respectively. Stators 132A and B each include a respective stator core 112A and 112B and a respective coil winding assemblies 116A and 116B. Stator cores 112A and 112B preferably are made of a magnetically permeable, highly resistive material such as SMC powder or silicon steel. In one example, stator cores 112A and 112B may be made of a strip of laminated electrical steel wound into a bobbin and cut to form the appropriate shape.

Coil windings assemblies 116A and 116B are preferably made of an electrically conductive material. For example, coil windings assemblies 116A and 116B may be made of copper, aluminum, silver, gold, or other high conductivity electrical materials. Current is passed through coil windings assemblies 116A and 116B to induce a magnetic field in stator cores 112A and 112B.

The changing magnetic field flux is applied by the stator axially across the airgap and into the rotor. In response to the changing magnetic field flux, current is induced in the rotor bars. This induced current in the rotor bars itself produces a magnetic flux that opposes (but is less than enough to balance) the applied magnetic flux passing through the rotor. The induced current in the rotor bars produces Lorentz force reactions in response to the net magnetic field and thereby generates torque. In this way, axial flux machine 100 can behave as a motor.

In a similar manner, axial flux machine 100 can behave as a generator. When the rotor is excited by a magnetic field produced by a stator winding, it starts to follow the rotating magnetic field produced by the stator resulting in rotor rotational movement. When the excited rotor, with help of external mechanical torque applied to the shaft, rotates faster than the stator's magnetic field the speed of magnetic flux (linked with stator winding) change rises, and the induced voltage in stator winding is raised respectively. The induced voltage in the stator winding becomes higher than the voltage in an attached electrical circuit, which was used for rotor initial excitation. Thus, electrical power flows from electrical machine stators to the attached circuit. In this way, the electrical machine turns to electrical generator.

FIGS. 10A-D illustrate how an axial flux induction motor produces torque according to some embodiments.

Figure 10A:
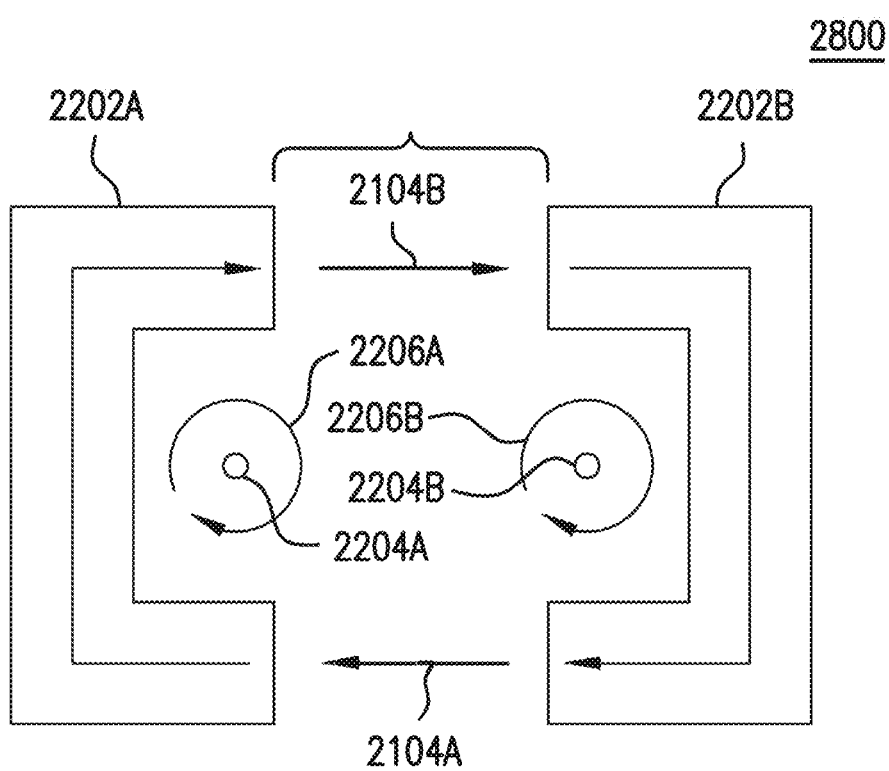
FIGS. 10A-D illustrate how an axial flux induction motor produces torque according to some embodiments.

FIG. 10A shows a diagram 2800 illustrating a winding 2204A around a tooth of stator 2202A and a winding 2204B around a tooth of stator 2202B. Windings 2204A and 2204B may be simple copper wires. A current perpendicular to and oriented INTO the plane of the drawing through winding 2204A creates (via the right-hand rule) a magnetic field 2206A, and a current perpendicular to and oriented INTO the plane of the drawing through winding 2204B creates a magnetic field 2206B. Stators 2202A and 2202B are made of a magnetically permeable material. Thus, magnetic fields 2206A and 2206B magnetize a magnetic circuit which includes magnetic flux lines 2104A and 2104B.

Figure 10B:
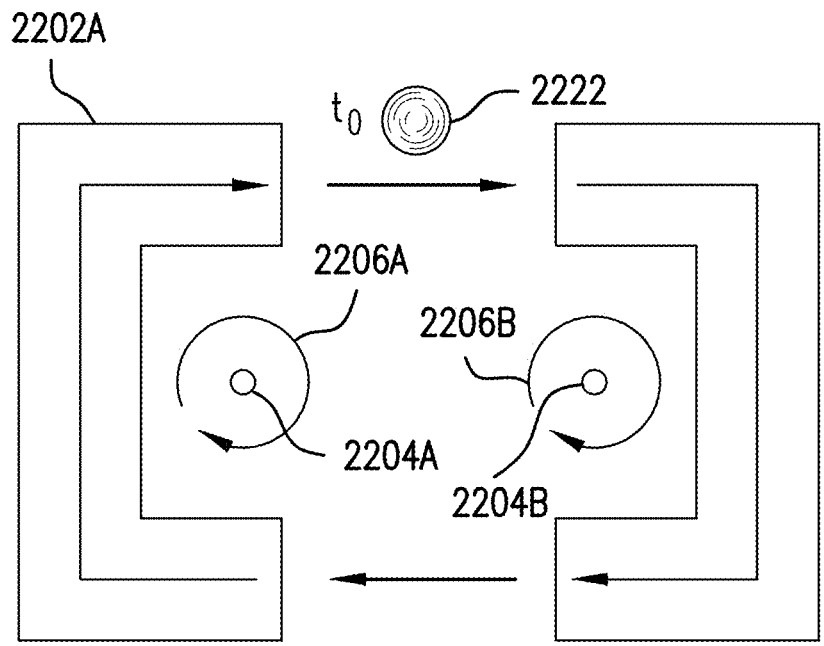

FIG. 10B shows a diagram 2220, similar to diagram 2200 in FIG. 10A. In addition to the components in diagram 2200, diagram 2220 illustrates a rotor bar 2222 at time to.

Figure 10C:
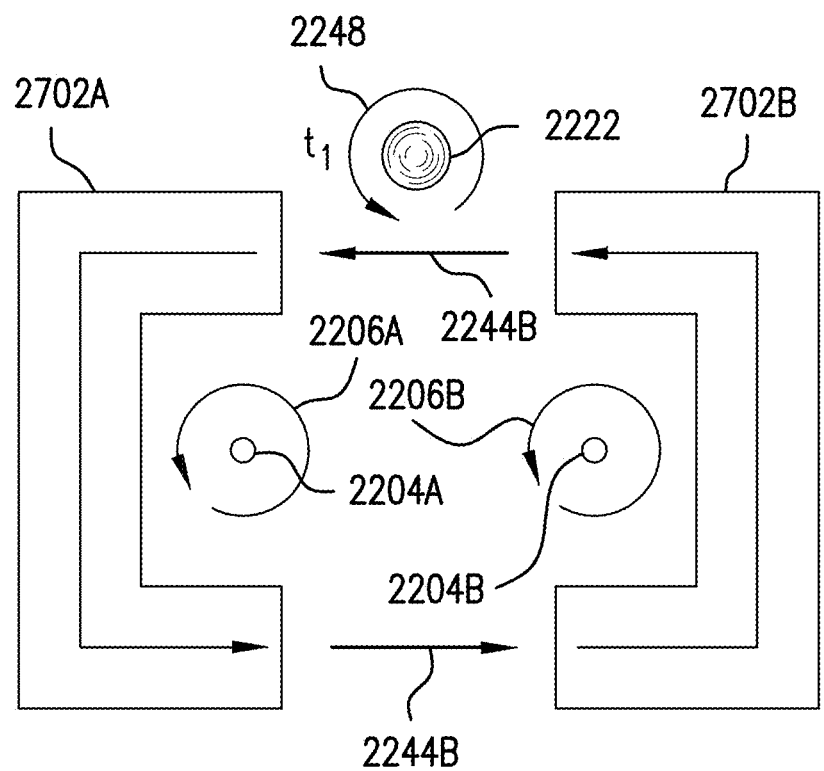

FIG. 10C shows a diagram 2240, advancing to a later time $t_1$. The current going through windings 2204A and 2204B is alternating current and is synchronized. Hence, at the later time $t_1$, current going through windings 2204A and 2204B has changed direction. Because current going through windings 2204A and 2204B has changed direction, the magnetic flux produced by the current and magnetic fields 2206A and 2206B has also changed direction since to. The changing magnetic fields 2206A and 2206B change the magnetic flux through the stators, illustrated by flux lines 2244A and 2244B. The changing flux induces a current in rotor bar 2222. The current in rotor bar 2222 creates a magnetic field 2248 which is in opposition to the magnetic flux 2244A from $t_0$ to $t_1$. This induced current in rotor bar 2222 creates a torque in accordance with the Lorentz force law.

Note that torque is produced despite the fact that rotor bar 2222 may not have moved. In this way, embodiments can create torque even in a locked rotor situation. In fact, given enough current, significant locked rotor torque can be generated, at least over time periods short enough for heat to dissipate. This provides an advantage over many traditional radial induction motors having the same volume, which do not provide as significant locked rotor torque. Radial induction machines have a lower power density. Therefore, to produce equivalent locked rotor torque, the machine would have to be much larger. Moreover, this locked rotor torque is achieved without the need for permanent magnets as is traditionally necessary to produce the starting torque illustrated in FIG. 10C with equivalent volume and mass in the machine. Avoiding permanent magnets saves cost and avoids environmental damage needed to obtain the rare earth magnets. Also, permanent magnet motors fall off in efficiency at higher RPMs, because the magnetic field produced by the permanent magnets is fixed. In contrast, the induction motors contemplated in the current embodiment are more efficient at higher RPMs, since the rotor excitation can be changed to a needed value with stator voltages, currents and rotor slip.

Induction motors offer a number of other advantages as well. For example, while the shape of a torque curve may depend on several things (for example, the motor controller, the motor's magnetic system, the efficiency of the cooling system, etc.), in general induction motors have a more flatter or more consistent torque curve. Importantly, have their torque maxima at close to synchronous speed, which is a very complimentary behavior to that of a PM motor. Another benefit of induction machines is the absence of parts which could be demagnetized irreversibly by applied magnetic field with or without additional temperature. For PM machines, excessive magnetic flux produced by a stator with or without additional temperature may cause reversible or irreversible demagnetization of PMs.

Figure 10D:
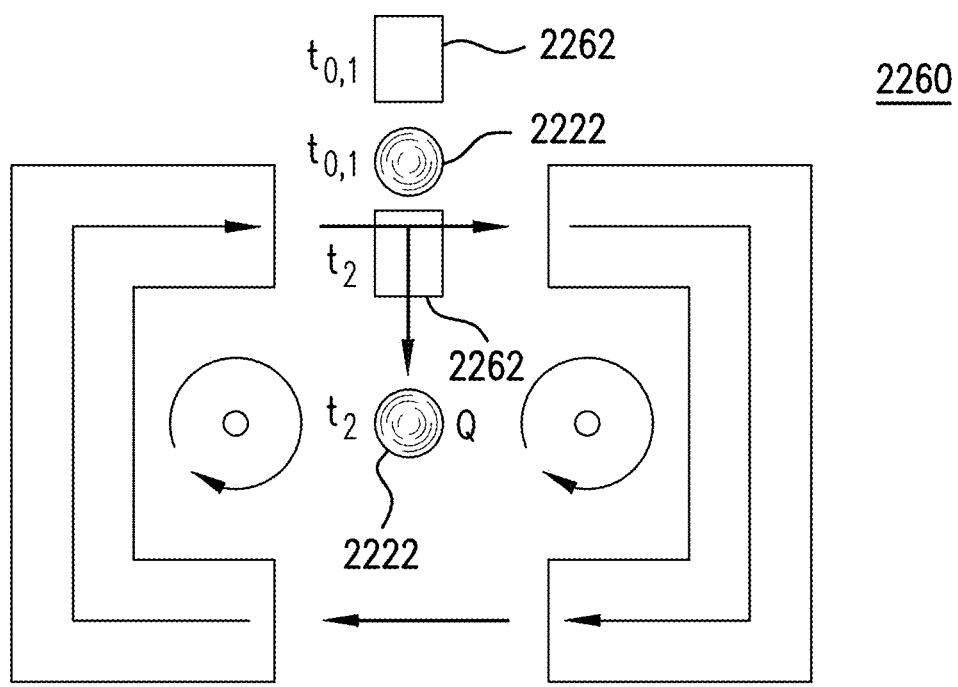

FIG. 10D is a diagram 2260 illustrating how additional torque is created once the rotor begins moving. In addition to the components in FIGS. 10A-C, diagram 2260 also illustrates a core 2262. When the rotor has a winding which is only made of electrically conductive material which has magnetic permeability close to that of air, as shown on FIG. 10C, a significant part of magnetic flux is dissipated on its way from stator 2702B to stator 2702A and vice versa. This way the rotor winding is crossed with less magnetic flux than what is produced by stators.

When ferromagnetic cores 2262 are placed into cavities of a rotor winding, magnetic flux gets a path from stator 2702A to 2702B with less magnetic resistance as equivalent air gap length is significantly shorter. This way less magnetic flux is dissipated and more magnetic flux crosses the rotor winding in perpendicular direction to the rotor winding turns which means the rotor winding gets more flux linkage (Psi), which is changed in time. Voltage induced in the rotor winding is equal to, or substantially corresponds to, relation dPsi/dt which means more flux linkage and more voltage is induced in the winding per single time step. Further the more voltage is induced in the rotor winding the more current is produced in the rotor. And more current in the rotor winding produces more electromagnetic torque in motor.

FIGS. 10A-D provide a simple example demonstrating how rotors according to the embodiment described herein can generate torque in an axial induction motor. FIGS. 10A-D involve just two stator teeth, a single rotor bar, and a single core.

Figure 11A:
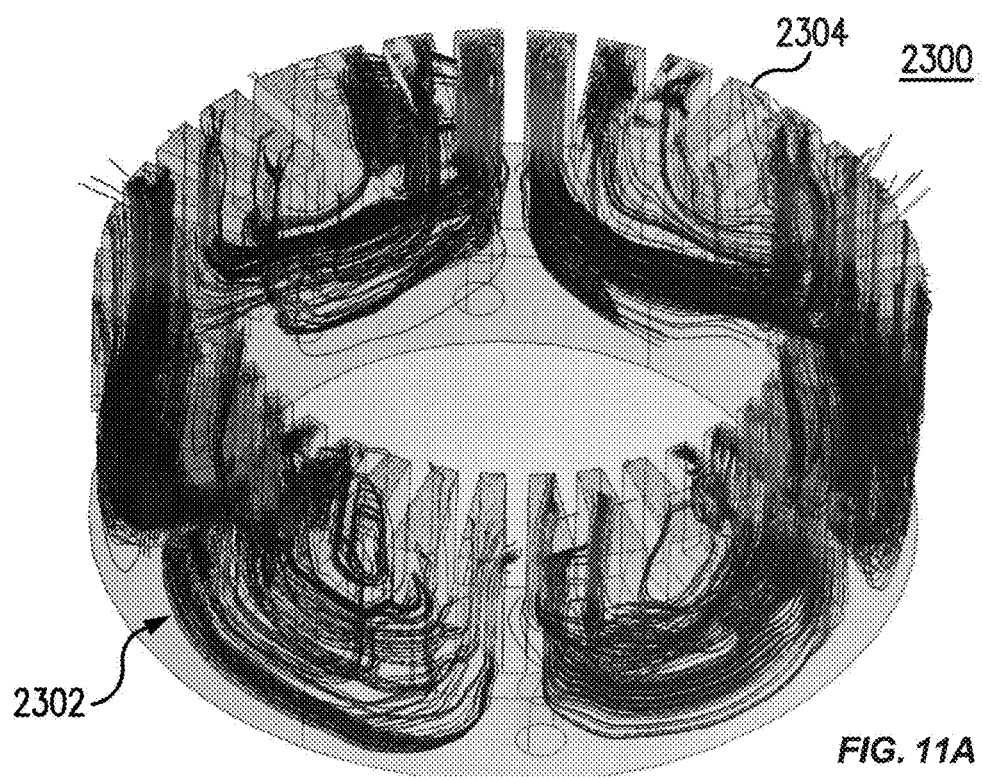
FIGS. 11A-B show a magnetic field and an electric current in a rotor for an axial flux motor according to some embodiments.
Figure 11B:
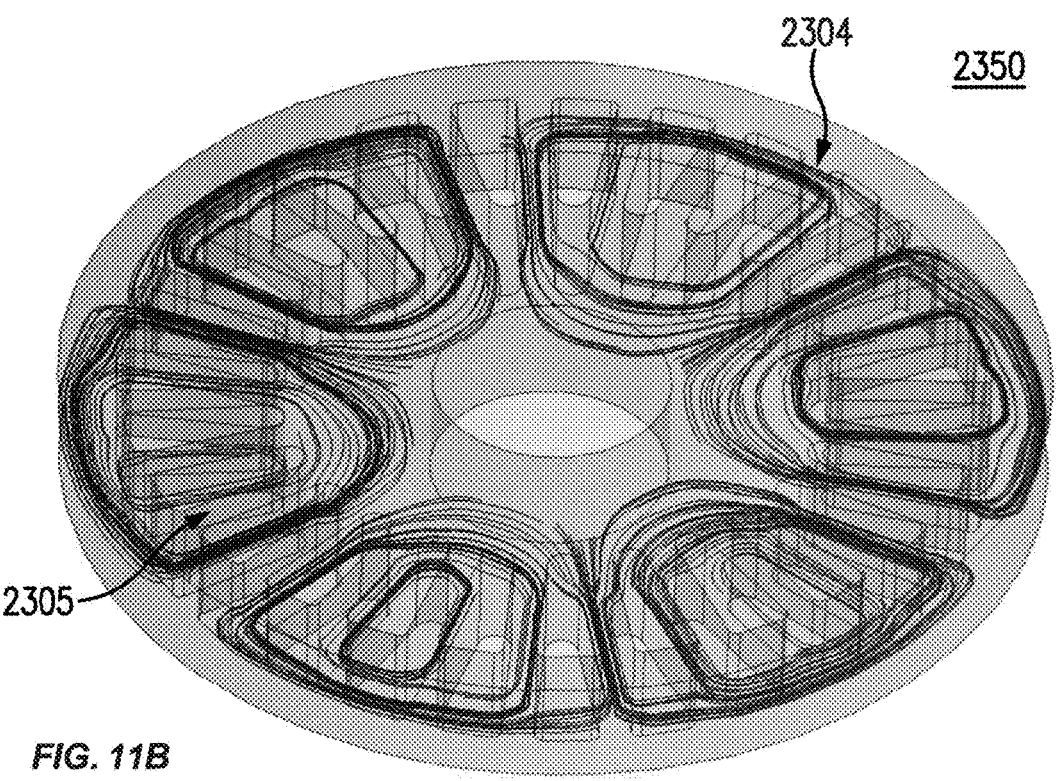

FIGS. 11A-B show a magnetic field and an electric current in a rotor for an axial flux motor according to some embodiments. FIG. 11A shows a diagram 2300 illustrating a magnetic field, and FIG. 11B shows a diagram 2350 illustrating an electric current in a rotor for an axial flux motor according to some embodiments. Diagram 2300 shows magnetic field lines 2302 in a stator 2304. The magnetic flux induces currents 2305 through rotor bars, such as rotor bar 2304, in the rotor. These induced currents produce torque in the same manner described for FIGS. 10A-D.

Three Dimensional Printed Coil Winding Assembly

Figure 2:
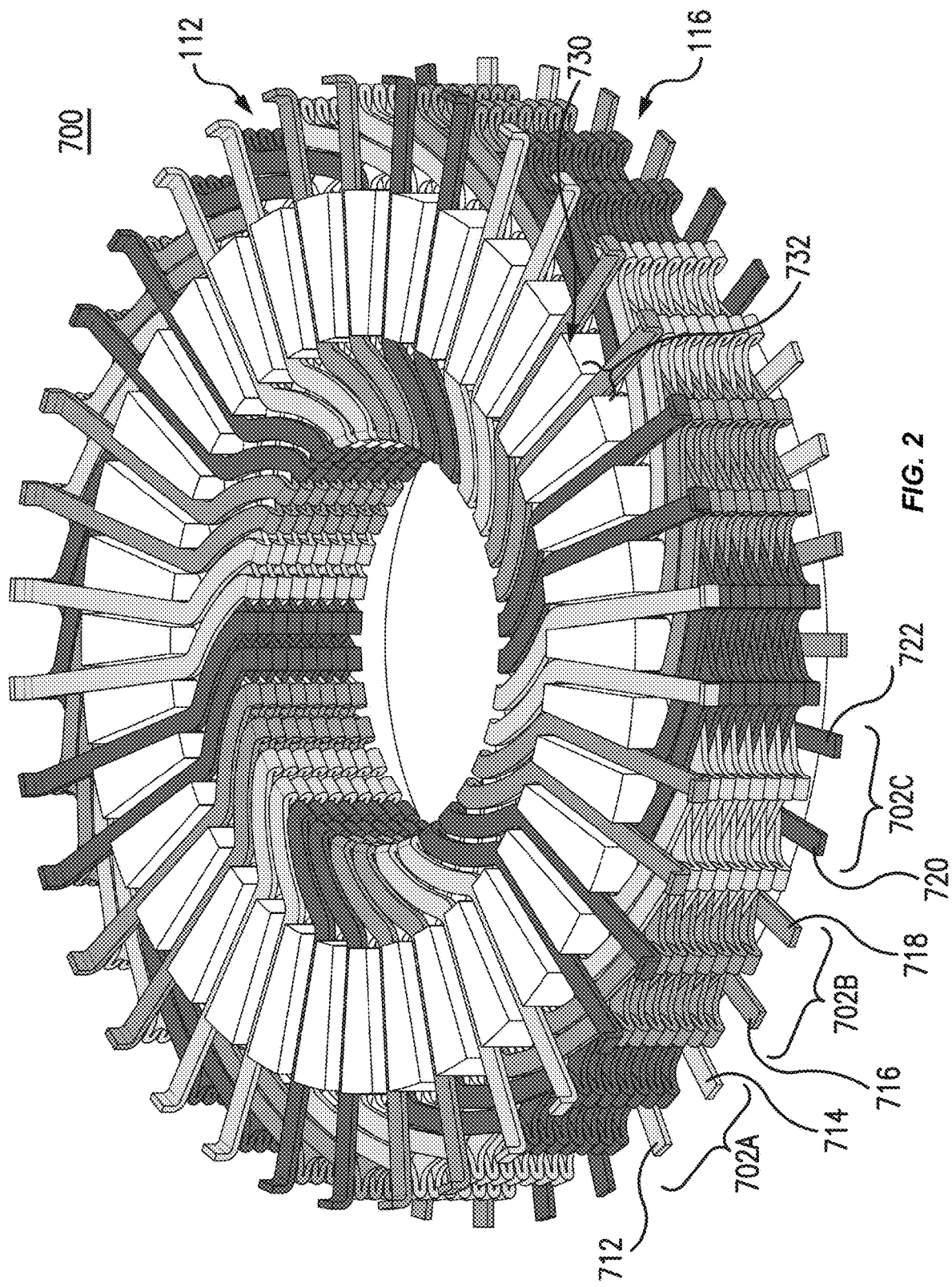
FIG. 2 illustrates a stator including a stator core and stator windings according some embodiments.

FIG. 2 illustrates a stator 700, similar to stators 132A-B in FIG. 1, including a stator core and a coil winding assembly according some embodiments. Stator 700 includes stator core 112 and coil assembly windings 116.

According to embodiments, coil assembly windings 116 may be 3D printed as a single piece, a unitary structure. Three dimensional printing uses additive manufacturing to construct a three-dimensional object from a CAD model or a digital 3D model. The additive manufacturing may involve selectively depositing pieces of material in positions defined by the digital model. The various pieces of material may be attached to each other using various techniques.

Examples of methods for three dimensional printing include powder bed fusion, direct energy deposition, binder jetting, and powder extrusion. Power bed fusion distributes a fine layer of powder over a build plate and then selectively melt a cross section of the part into the powder layer. Different methods to melt the powder bed are possible, including selective laser melting and electron beam melting.

While power bed fusion usually fuses on a layer-by-layer basis, direct energy deposition fuses respective voxels on the layer independently. With direct energy deposition, the metal material (which can be powder or wire) and the laser both sit on a single print head that dispenses and fuses material simultaneously.

Binder jetting evenly distributes metal powder over its print bed, forming an unbound layer. Then, a jetting head distributes binding polymer in the shape of the part cross section, loosely adhering the powder. The process repeats until the part is printed. The printed part undergoes a post-processing sintering step to become fully metallic. During the sintering step, the part is heated to just below its melting temperature, causing the binding material to burns away and the metal powder to fuse together into a full metal part.

Unlike most other metal printing techniques, bound powder extrusion typically does not use loose metal powder. Instead, with bound powder extrusion, the powder is bound together in waxy polymers. The waxy polymer-metal powder mixture is extruded from a nozzle into a filament and positioned at the appropriate place to form a layer. After the part is made from the waxy polymer-metal powder, the part is washed to dissolve much of the polymer. Then the washed part is sintered as with the binder jetting process.

Stator core 112 may have a base and a number of teeth, such as tooth 730. The teeth are separated by slots, such as slot 732. The teeth protrude upward from the base and the base shorts magnetic circuits between the respective teeth. In a preferred embodiment, stator core 112 may have 36 teeth. Coils of coil assembly winding 116 surround teeth 730. Coil assembly winding 116 includes a plurality of coils such as coils 712, 714, 716, 718, 720, and 722. In a preferred embodiment, coil assembly winding 116 may have a number of coils that corresponds to a number of teeth in stator core 112. For example, in a preferred embodiment, stator core 112 may have 36 teeth. Thus, coil windings assemblies 116 may have 36 coils.

Each coil of coil winding assembly 500 has a plurality of "turns." Each turn represents a loop of the winding back to its original lateral point. In the preferred embodiment, such as the embodiment disclosed in FIG. 3, a coil may have five turns, all of common shape. The number of turns corresponds to a thickness of the rectangular wire in the axial direction and a height of the stator teeth to maximize the volume of space in the slot occupied by copper.

In this embodiment, each coil is configured to enclose four stator teeth. Based on the number of teeth that the coil encloses, each coil may have different geometries and shapes. This segment of wire is positioned to pass between two stator teeth, though the slot.

These alternating directions provide the ability for the coils to interlace and lap on top of one another. In other words, a segment of an adjacent coil (not shown) can rest on top of a segment of another coil. This is shown at the overlap of coils 800A and 800B in FIG. 3. This can be extended to several different coils. For example, three or four coils may be interleaved into coil 800 when assembled into the stator windings. By having the segments that extend out radially from the axis of rotation, the windings form a unique "truncated pie wedge" shape. The leads of each coil are attached to the interconnect bars as described herein.

The coils in coil assembly winding 116 may be designated as belonging to a phase. For example, the coils in coil assembly winding 116 may belong to one of three phases, each representing a different, closed electrical circuit. The coils in each phase make up a coil group. In the preferred embodiment shown in FIG. 2, two coils having a common phase are placed immediately next to each other (making a coil pair) following the two alternate phases. For example, coil 714 is adjacent to coil 712. Both coil 714 and 712 are part of a first phase, labeled phase 702A. That pair of coils in phase 702A is adjacent to a pair of coils in a different phase, phase 702B. The adjacent pair of coils in that phase is coils 716 and 718. Following those coils is a third pair of coils, coils 720 and 722, in a third phase, phase 702C. This pattern, AA, BB, CC, repeatedly continues around the stator for all 36 coils.

Figure 3:
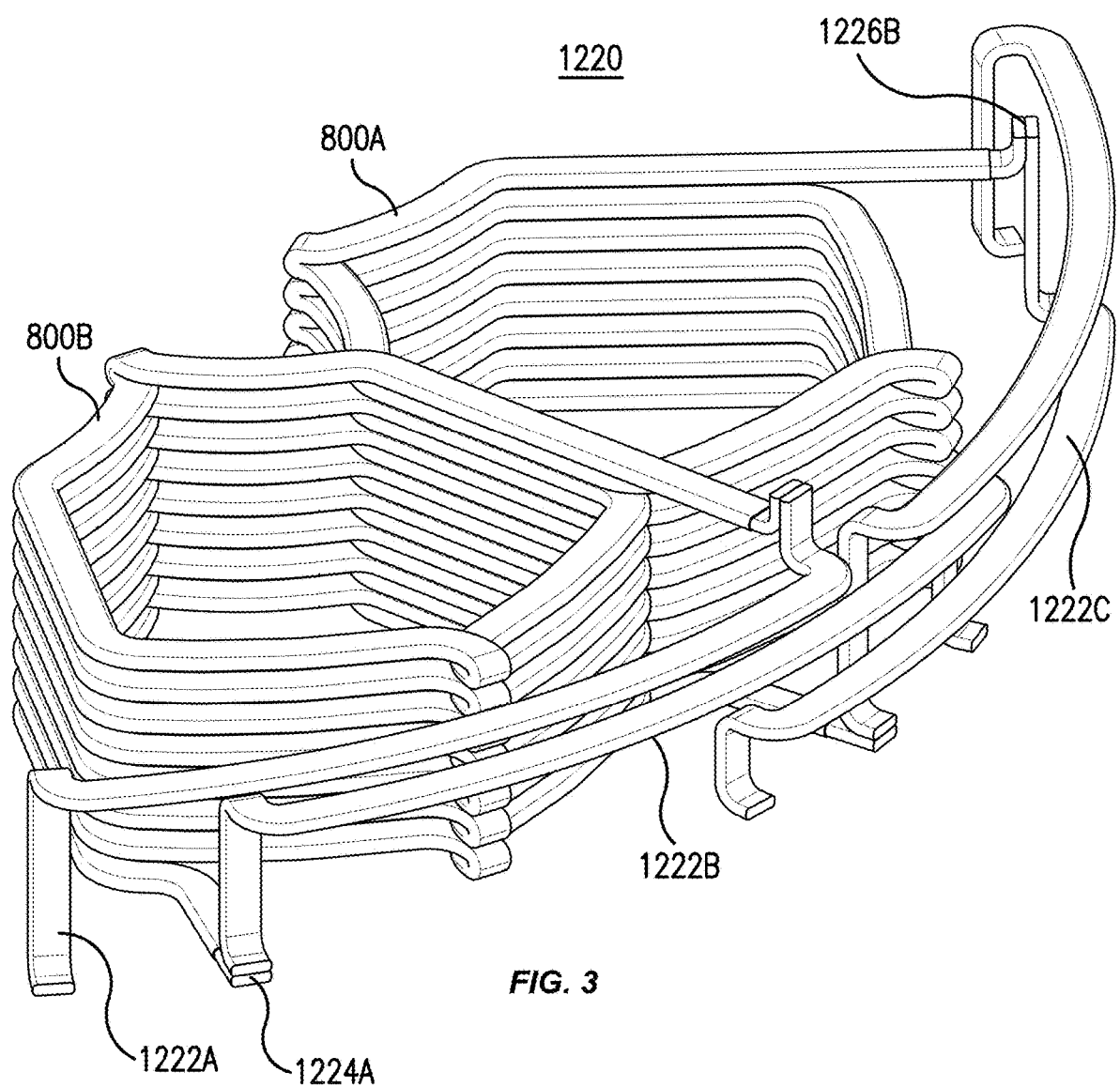
FIG. 3 illustrate two coils with a lapped portion and interconnects.

FIG. 3 illustrates a diagram 1200 with two coils 800A and 800B lapped on one another with interconnects extending between the coil components. Although dividing lines are shown between coils 800A and 800B and interconnects 1222A, 1222B, and 1222C, it should be understood that this is done for purposes of explanation. As described throughout, interconnects and the coils may be printed using a three dimensional printer as a unitary structure such that coils 800A and 800B are printed contiguously with interconnects 1222A, 1222B, and 1222C. Coil 800A has interconnect 1222C extending from upper lead 1226B. Coil 800B has interconnect 1222B extending from lower lead 1224A. The interconnects may be shaped to be joined with coils from the same phase and to extend the phase circuit around a perimeter of a stator winding.

Figure 4:
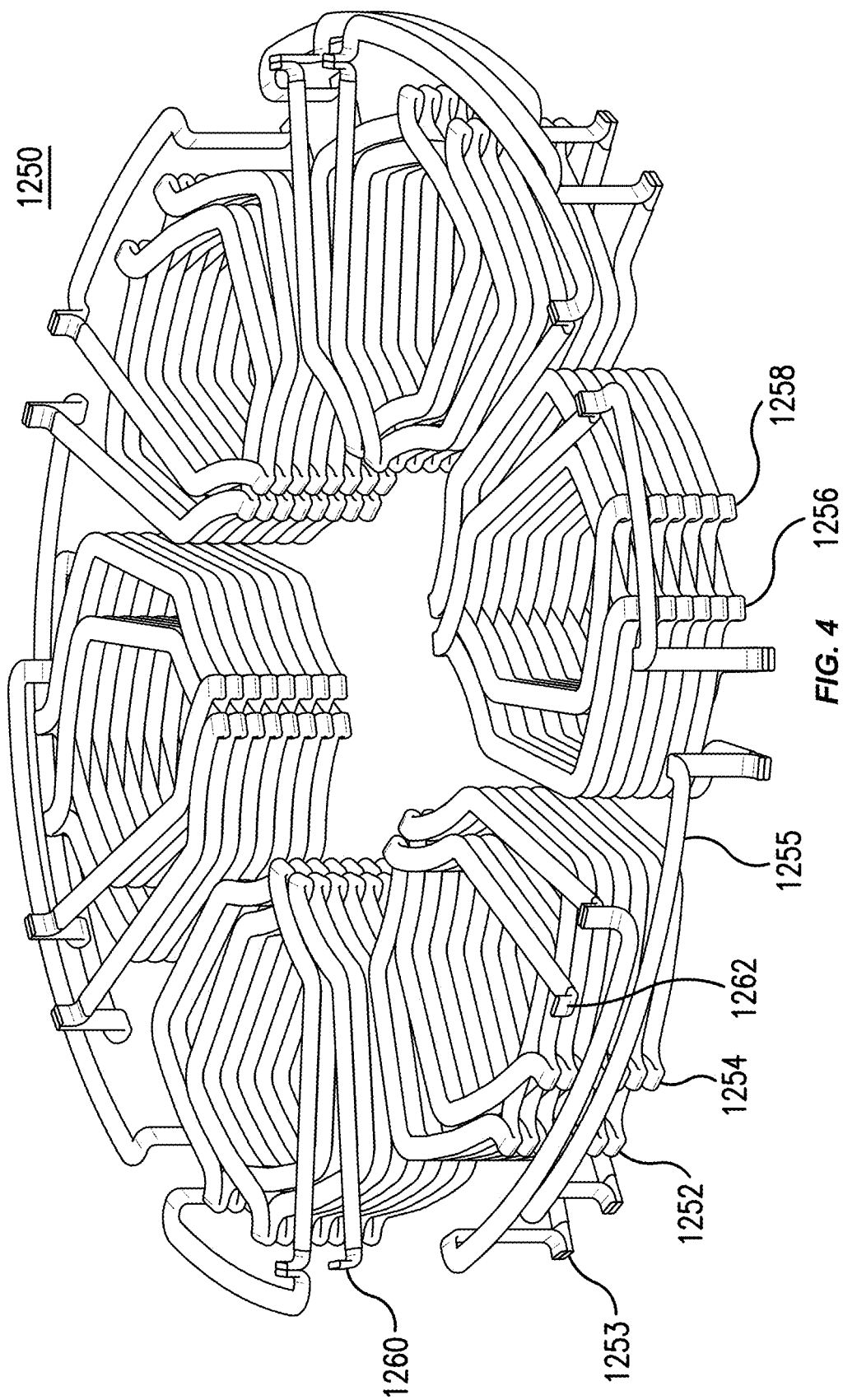
FIG. 4 illustrates coils of a single phase of a winding with interconnects.
Figure 9:
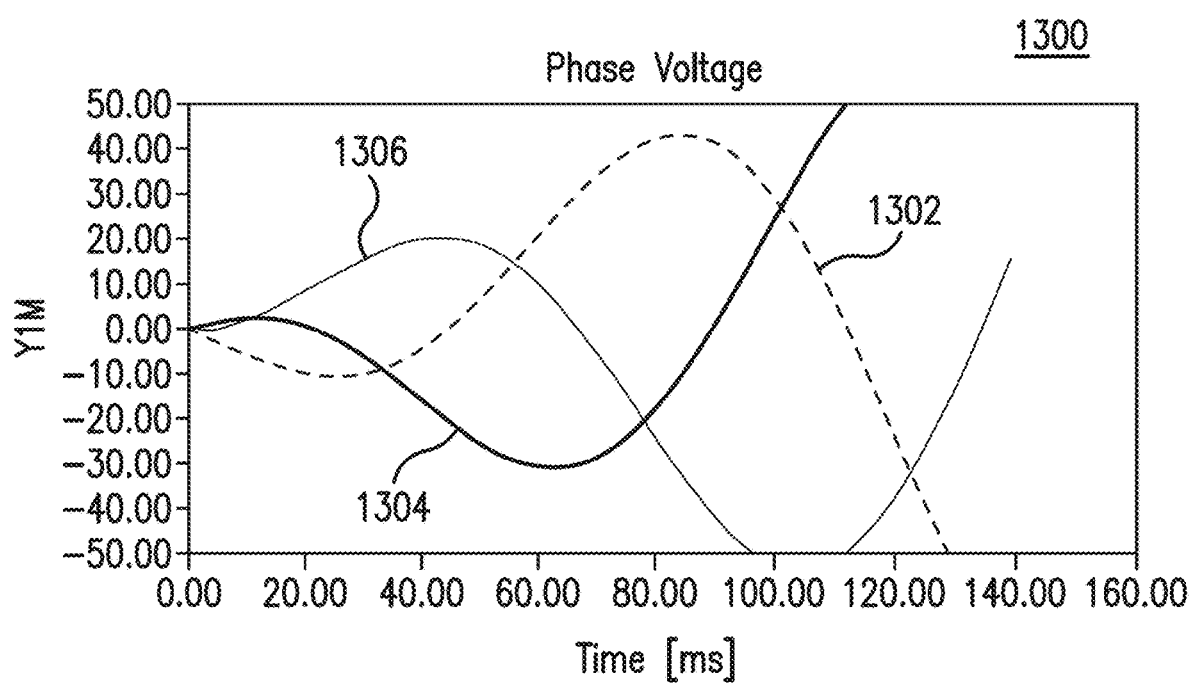
FIG. 9 illustrates example signals applied to three phases of the stator coils.

FIG. 4 illustrates a diagram 1250 that shows a single phase of a stator winding interconnected together. Adjacent coils 1252 and 1254 are connected with interconnects 1253. The pair of adjacent coils 1252 and 1254 are connected with another adjacent pair of coils 1256 and 1258 via a longer interconnect 1255. This pattern continues to join all of the applicable coils (in this instance, 12 coils) into the phase group (there are 3 phase groups in the overall stator coil assembly). Joints 1260 and 1262 represent points that are loaded with a periodically varying electrical signal as illustrated in FIG. 9.

Figure 5:
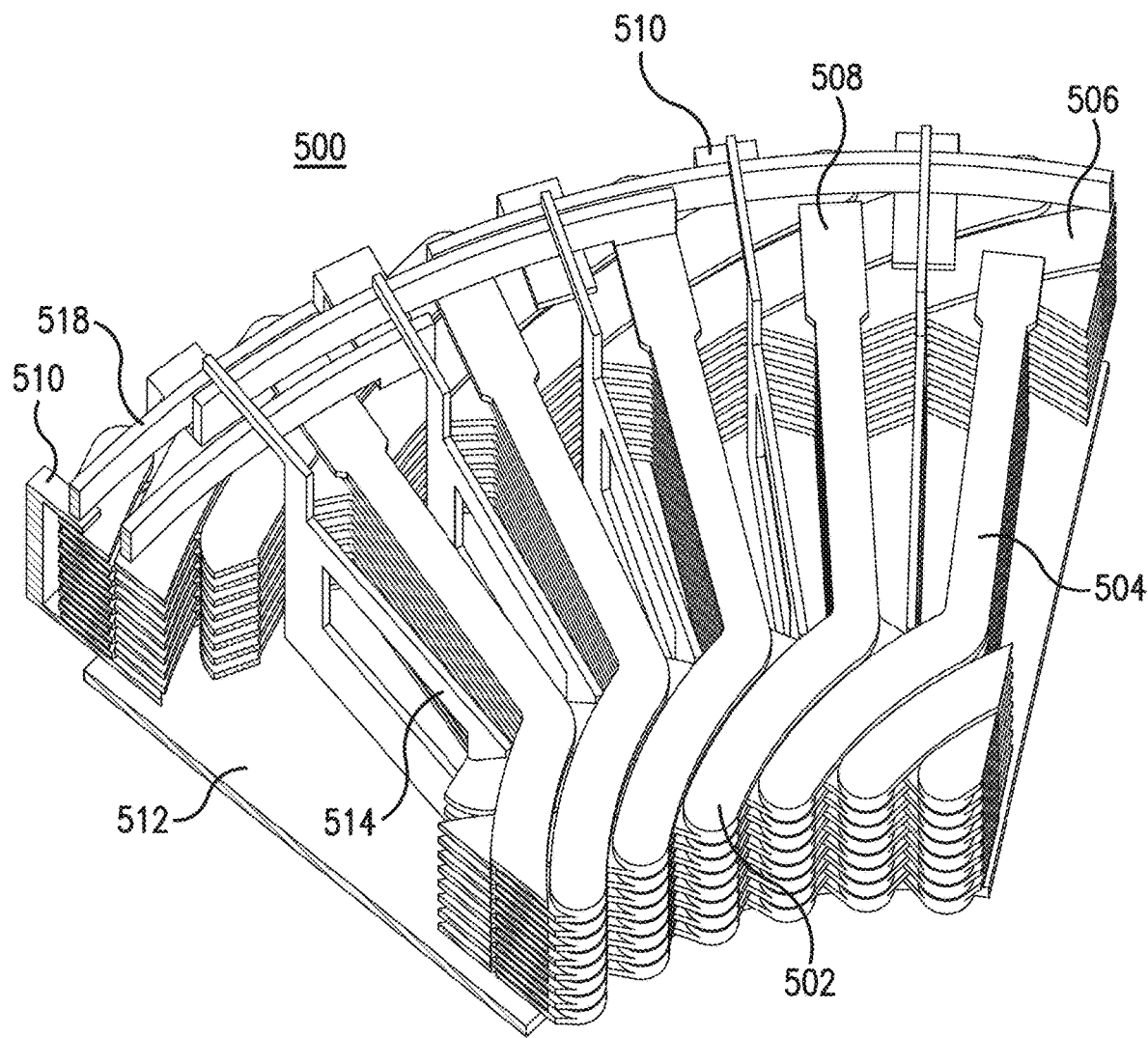
FIG. 5 illustrates a section of a coil assembly formed using a three dimensional printer with printing supports.

FIG. 5 illustrates a section of a coil winding assembly 500 printed using a three dimensional printer. Although only a section is shown in FIG. 5, it is understood that the entire coil winding is printed at the same time. Coil winding assembly 500 may be printed of a variety of materials. For example, coil winding assembly 500 may be printed of ETP or OFHC copper. Coil winding assembly 500 may be formed of any conductive material.

A three dimensional printer may print coil winding assembly 500 with various segments. For example, coil winding assembly 500 may have an inner segment 502, a slot segment 504, and an outer segment 506. Inner segment 502 may be arranged to be interior of the stator and outer segment 506 is arranged to be exterior of the stator. Slot segment 504 extends radial (that is, a direction extending from an axis along a radius of a machine) between inner segment 502 and outer segment 506. Slot segment 504 of wire is positioned to pass between two stator teeth, though the slot. Accordingly, the width of slot segment 504 may correspond to a width of the slots. For example, each slot may be wide enough to fit a single wire across plus a small allowance for insulating paper and manufacturing tolerance. Inner segment 502 and outer segment 506 may be angled relative to slot segment 504. For example, as shown in FIG. 5, inner segment 502 and outer segment 506 are angled in a clockwise direction around a center of a stator. The angling of inner segment 502 and outer segment 506 may permit greater space saving by keeping the overall outer diameter of stator or coil winding assembly 500 to a minimum.

A three dimensional printer may also print additional components. For example, three dimensional printer may print upper lead 508 and lower lead 510. Although referred to as "upper" and "lower" leads, such a convention is used only convenience to describe relative place of the leads. For example, upper lead 508 may be on one side of coil winding assembly 500 and lower lead 510 may be on another, or opposite, side of coil winding assembly 500. Upper lead 508 and lower lead 510 are configured to be coupled to electrical leads. The electrical leads provide electric current to each coil of coil winding assembly 500.

Three dimensional printer may also print additional components for the manufacture of coil winding assembly 500. Certain of these components may not be necessary for the operation of coil winding assembly 500, but may be necessary support structures used during the three dimensional printing process. For example, three dimensional printer may print a base 512. Base 512 may support coil winding assembly 500 and additional support components. For example, base 512 may also support risers 514. Risers 514 may be used to structurally support components of coil winding assembly 500 during the printing process. These components may be printed with weak points to facilitate the later removal of the components from coil winding assembly 500. For example, the structural support components may be configured to be broken away from coil winding assembly by hand or through subsequent machining. In some embodiments, the support components may be printed of a different material from coil winding assembly 500. Heat or a chemical solution may be applied to dissolve the material of the support components.

In some embodiments, a three dimensional printer also prints interconnects 518. Interconnects 518 connect upper leads 508 and lower leads 510 of coils pairs. In some embodiments, coils may be connected by interconnects 518 such that all applicable coils are connected a phase group. In some embodiments, as described above, coil winding assembly 500 may include three phase groups. Each phase group may have an equal number of coils. For example, coil winding assembly 500 may have 36 coils and three phases. Each phase will have 12 coils.

Figure 6:
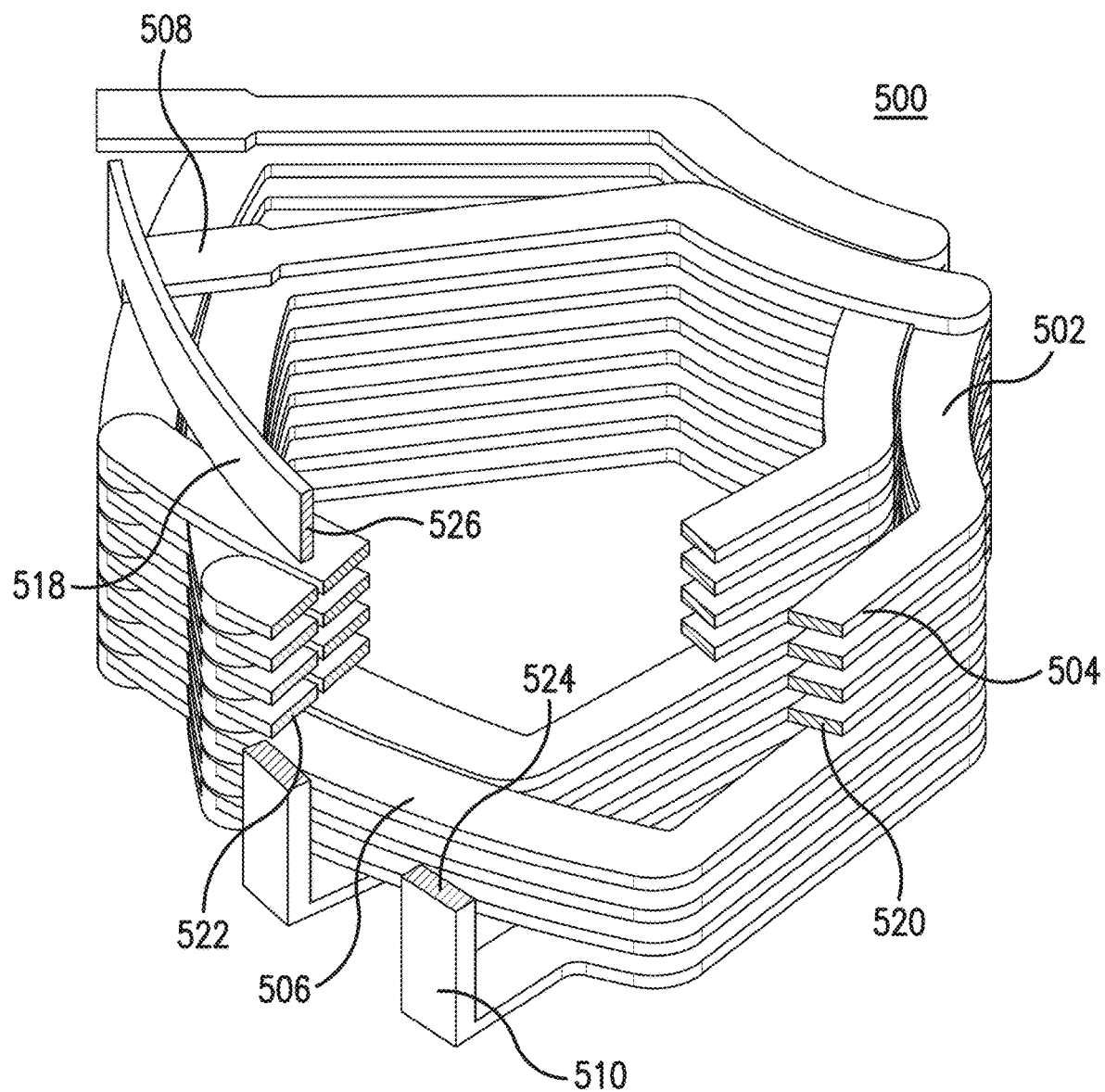
FIG. 6 illustrates cross-sectional views of portions of a coil assembly.

FIG. 6 illustrates a section of coil winding assembly 500 according to some embodiments. Each coil in coil winding assembly 500 has inner segments 502, slot segments 504, and outer segments 506. Additionally, each coil in coil winding assembly 500 has upper lead 508 and lower lead 510

In some embodiments, upper lead 508 and lower lead 510 extend such that they converge on the same side of coil winding assembly 500. For example, as shown in FIG. 6, lower leads 510 extend axially to the same side of coil winding assembly 500 as upper lead 508. Lower leads 510 connect with interconnects 518 on the same side of coil winding assembly 500 as upper leads 508. In this way, all interconnects 518 may be centralized on one side of coil winding assembly 500.

As shown in FIG. 6, slot segment 504 has a slot segment cross section area 520. Additional segments have segment cross section areas. For example, as shown in FIG. 6, outer segment 506 has outer segment cross section area 522, lower lead 510 has lower lead cross section area 524 and interconnect 518 has interconnect cross section area 526. As previously discussed, the amount of current passing through the segments of a coil is the same. For example, the current passing through outer segment 506, to slot segment 504, to inner segment 502 is the same. However, the current density may change. Current density is the amount of current passing through the volume. Current density can be increased or decreased by decreasing or increasing the cross sectional area of the segment, respectively. Importantly, current density corresponds with temperature. A higher current density may create a higher temperature in the segment, while a lower current density may cause a lower temperature in the segment. By changing the cross sectional area of segments of coil winding assembly 500, the current density and temperature can be better controlled.

As previously described, slot segments 504 are configured to be located inside slots of stator. Each slot has a defined dimension. Accordingly, a width of the slot segment 504 should be less than a width of stator slot so that slot segment 504 may fit into stator slot. Accordingly, the dimensions of slot segment 504 may be constrained. However, inner segment 502 and outer segment 506 may have fewer dimensional constrains. For example, inner segment 502 and outer segment 506 may have a width greater than the width of slot segment 504. Assuming the same thickness of inner segment 502, slot segment 504, and outer segment 506, the cross section area of inner segment 502 and outer segment 506 may be increased by increasing the width of both of these segments.

Figure 7:
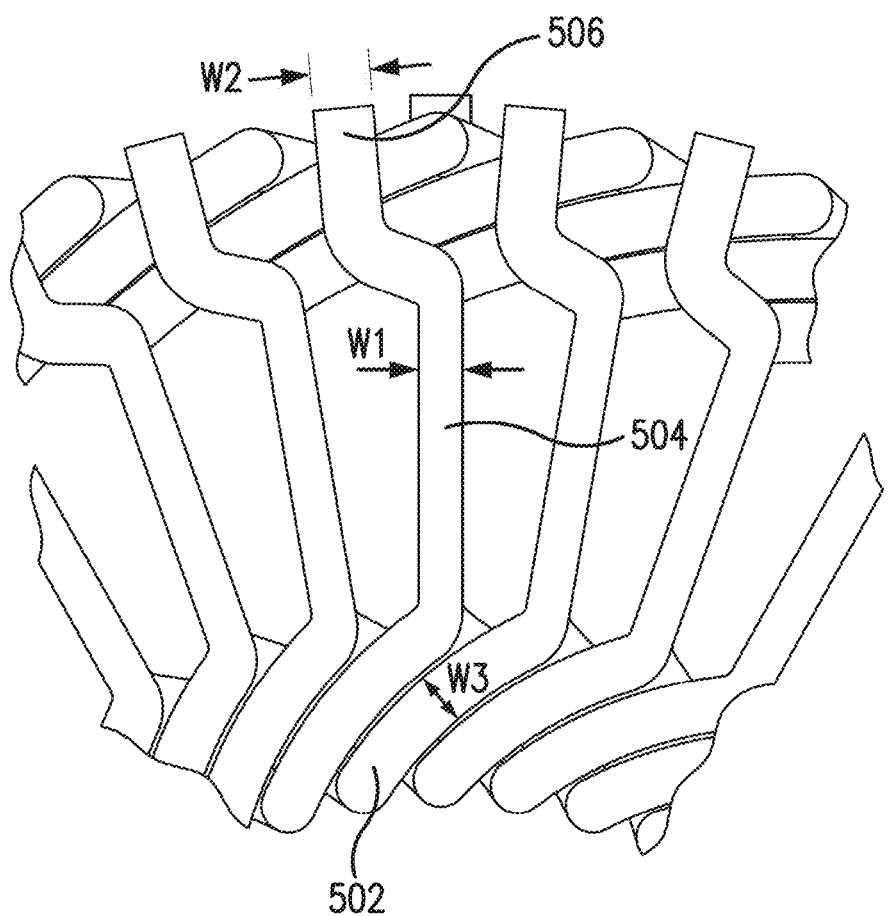
FIG. 7 illustrates a section of a coil winding.

FIG. 7 illustrates a plan view of a section of coil winding assembly 500. Each coil of coil winding assembly 500 has inner segment 502 having an inner segment width W3. Slot segments 504 extends from inner segment 502 and has a slot segment width W1. Outer segment 506 extends from slot segment 504 and has an outer segment width W2. In some embodiments, slot segment width W1 is smaller than inner segment width W3 and outer segment width W2. Inner segment width W3 and outer segment width W2 may be equal or different. For example inner segment width W3 may be less than outer segment width W2. Inner segment width W3 may be smaller than outer segment width W2 because the area able to be occupied by inner segments 502 is constrained by the interior area of stator.

Figure 8:
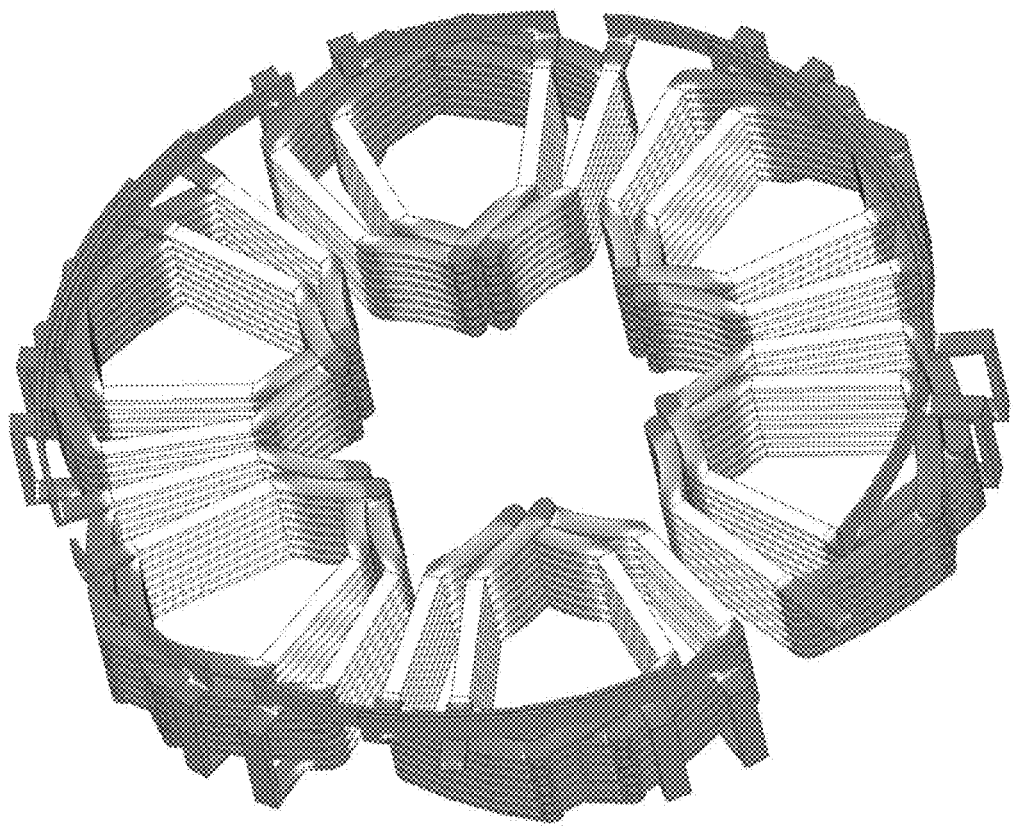
FIG. 8 illustrates the current density of a three dimensional printed coil winding assembly.

As previously stated, the use of varying segment widths reduces the current density in coil winding assembly 500. FIG. 8 shows a current density distribution in coil winding assembly 500. In the embodiment shown in FIG. 8, outer segment width W2 is greater than inner segment width W3, which is greater than slot segment width W1 (i.e., W1<W3<W2). Lighter areas in FIG. 8 show higher current densities while darker areas show lower current densities. As FIG. 8 illustrates, the current density in the outer segments with the greatest width is less than the current density of inner segments. And the current density of inner segments is less than the current density in slot segments.

In some embodiments, insulation is added to coil winding assembly 500. Insulation prevents current from moving between adjacent coils. This prevents short circuits and optimizes the efficiency of the motor. Insulation may be applied in several ways. For example, insulation may be printed using a three dimensional printer contemporaneously with the printing of conductive segments of coil winding assembly 500.

Insulation may also be applied after the conductive segments of coil winding assembly 500 are printed. For example, the insulation may be applied by placing winding 500 in a liquid bath of insulating material. In this embodiment, air gaps are left by the printer between respective turns of the coils in the axial direction to leave space for the insulating material. The insulating material may dry to form insulation layers on each of the coils of coil winding assembly 500. The insulation may be applied after the part is printed, but before the supports are removed. In this way, once the supports are removed, the insulation can provide the structural support for the winding needed to maintain its shape and avoid short circuits.

FIG. 9 illustrates a diagram 1300 showing example signals applied to three phases of the stator coils. The signals shown here are illustrative of a three phase machine. In other embodiments, a different number of phases may be present. In particular, diagram 1300 shows a signal 1302, a signal 1304, and a signal 1306. Each of signals 1302, 1304, and 1306 may be periodically varying electrical signals, such as sine waves. The sinusoidal signals 1302, 1304, and 1306 are offset by 120° of phase from one another. In embodiments having a different number of phases the offsets may be different. By varying the amplitude, frequency, and absolute phase of these signals (but not their relative phase angle relationship), operation of the electric motor may be controlled.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents. Identifiers, such as (a), (b) and (i), (ii) are for ease of identification and are not meant to imply an order.

What is claimed is:

1. A stator for a rotating electrical machine, the stator comprising:
    a core comprising a plurality of teeth configured to transmit magnetic flux to or from a rotor of the rotating electrical machine; and
    a winding comprising a plurality of coils and interconnects connecting the plurality of coils, each coil including a plurality of layers and configured to be formed on a tooth from the plurality of teeth and to pass current to generate or receive the magnetic flux, the winding formed in its entirety as a single piece using three-dimensional printing.

2. The stator of claim 1, wherein the plurality of layers includes at least three layers.

3. The stator of claim 1, wherein the plurality of layers are lapped on one another such that the lapped layers form openings configured to receive a stator core.

4. The stator of claim 1,
    wherein the plurality of coils comprise a first, a second, and a third phase circuit such that each coil in the plurality of coils is electrically connected to one of the first, second, and third phase circuit, and
    wherein each of the first, second, and third phase circuit is configured to carry a periodically varying electrical signal.

5. The stator of claim 4, wherein the electrical signal carried by each phase circuit is offset from other electrical signals carried by the other phase circuits.

6. The stator of claim 5, wherein the offset is 120 degrees.

7. The stator of claim 4, wherein lapped coils of adjacent coil layers in the plurality of layers are electrically connected to the same phase circuit.

8. The stator of claim 1, further comprising, applying insulation to the winding.

9. The stator of claim 8, wherein applying the insulation to the winding comprises printing an insulating material on each coil layer.

10. The stator of claim 1,
    wherein each coil in the plurality of coils comprises a first segment and a second segment,
    wherein the first segment has a first cross section area and the second segment has a second cross section area, and
    wherein the first cross section area is greater than the second cross section area.

11. The stator of claim 10, wherein the first segment is one of an outer segment to fit outside the core and an inner segment to fit inside the core, and wherein the second segment is a slot segment to fit in a slot between teeth of the plurality of teeth.

12. The stator of claim 10, wherein the second segment of each coil are radially aligned.

13. The stator of claim 10, wherein the first segment is connected to one of the interconnects.

14. The stator of claim 10, wherein the second segment has a rectangular cross section.

15. The stator of claim 10, wherein the width of the second cross section area corresponds to a width of a slot between teeth of the plurality of teeth.

* * * * *